(12) United States Patent
Chen et al.

(10) Patent No.: US 12,530,651 B2
(45) Date of Patent: Jan. 20, 2026

(54) SYNTHETIC MOLECULAR TAGS FOR SUPPLY CHAIN TRACKING

(71) Applicant: MICROSOFT TECHNOLOGY LICENSING, LLC, Redmond, WA (US)

(72) Inventors: Yuan-Jyue Chen, Seattle, WA (US); Karin Strauss, Seattle, WA (US); Bichlien Hoang Nguyen, Seattle, WA (US); Jonathan Bernard Lester, Bellevue, WA (US); Hari Krishnan Srinivasan, Redmond, WA (US); Upendra Singh, Redmond, WA (US); Peeyush Kumar, Seattle, WA (US); Ranveer Chandra, Kirkland, WA (US); Anirudh Badam, Issaquah, WA (US); Michael McNab Bassani, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 808 days.

(21) Appl. No.: 17/511,454

(22) Filed: Oct. 26, 2021

(65) Prior Publication Data

US 2023/0125457 A1 Apr. 27, 2023

(51) Int. Cl.
 *C12Q 1/68* (2018.01)
 *C12Q 1/6844* (2018.01)
 (Continued)

(52) U.S. Cl.
 CPC ....... *G06Q 10/0833* (2013.01); *C12Q 1/6846* (2013.01); *G06K 7/143* (2013.01);
 (Continued)

(58) Field of Classification Search
 None
 See application file for complete search history.

(56) References Cited

U.S. PATENT DOCUMENTS

| 8,415,164 B2 | 4/2013 | Hayward et al. |
| 2006/0121181 A1* | 6/2006 | Sleat .............. D21H 21/46 |
| | | 427/256 |

(Continued)

FOREIGN PATENT DOCUMENTS

| EP | 1237327 A2 | 9/2002 |
| ES | 2273531 A1 | 5/2007 |

(Continued)

OTHER PUBLICATIONS

Final Office Action mailed on Mar. 22, 2024, in U.S. Appl. No. 17/490,694, 25 pages.

(Continued)

*Primary Examiner* — Aaron A Priest
(74) *Attorney, Agent, or Firm* — Benjamin Keim; Newport IP, LLC

(57) ABSTRACT

Synthetic molecular tags are placed on an item at various points in a supply chain to create a molecular record of movement through the supply chain. Associations between each unique synthetic molecular tag and individual locations in the supply chain are stored in an electronic record which may be maintained in the cloud. The synthetic molecular tags are collected from the item and sequenced to determine movement of the item through the supply chain by reference to the electronic record. The synthetic molecular tags can be used for identifying recalled items based on locations in the supply chain associated with a recall. The synthetic molecular tags may be polynucleotides such as deoxyribose nucleic acid (DNA). The item may be any type of item including food.

11 Claims, 4 Drawing Sheets

(51) Int. Cl.
G06K 7/14 (2006.01)
G06N 3/123 (2023.01)
G06Q 10/0833 (2023.01)
G06Q 10/087 (2023.01)
G16B 30/00 (2019.01)

(52) U.S. Cl.
CPC ........... *G06N 3/123* (2013.01); *G06Q 10/087* (2013.01); *G16B 30/00* (2019.02)

(56) References Cited

U.S. PATENT DOCUMENTS

| | | | | |
|---|---|---|---|---|
| 2006/0286569 | A1* | 12/2006 | Bar-Or | C12Q 1/68 380/59 |
| 2007/0048761 | A1* | 3/2007 | Reep | C12Q 1/6816 435/6.11 |
| 2008/0293052 | A1* | 11/2008 | Liang | C09D 7/63 442/121 |
| 2008/0299559 | A1* | 12/2008 | Kwok | C09D 11/03 435/6.12 |
| 2011/0165569 | A1 | 7/2011 | Macula | |
| 2012/0135413 | A1* | 5/2012 | Brown | C12Q 1/6876 435/6.12 |
| 2013/0271758 | A1* | 10/2013 | Marchant | B82Y 30/00 356/301 |
| 2015/0018538 | A1 | 1/2015 | Berrada et al. | |
| 2015/0104802 | A1* | 4/2015 | Reep | C12Q 1/68 435/6.12 |
| 2015/0141264 | A1* | 5/2015 | Jung | C12Q 1/68 435/6.12 |
| 2015/0183257 | A1* | 7/2015 | Glendenning | B42D 25/324 283/67 |
| 2015/0379903 | A1* | 12/2015 | McLeod | A24D 3/10 |
| 2017/0021611 | A1* | 1/2017 | Jung | B41M 3/14 |
| 2018/0114168 | A1* | 4/2018 | Ryan | G06Q 10/08 |
| 2019/0241982 | A1* | 8/2019 | Hogan | C12Q 1/6895 |
| 2019/0271032 | A1* | 9/2019 | Owen | C12Q 1/6848 |
| 2019/0338354 | A1 | 11/2019 | Gonzales, Jr. | |
| 2020/0074124 | A1* | 3/2020 | Zografos | G06K 7/0004 |
| 2020/0074478 | A1* | 3/2020 | Peters | G06Q 10/0831 |
| 2020/0098460 | A1* | 3/2020 | Banks | G16H 40/20 |
| 2020/0370111 | A1 | 11/2020 | Ceze et al. | |
| 2020/0385824 | A1* | 12/2020 | Hogan | C14B 17/00 |
| 2021/0019973 | A1* | 1/2021 | Yin | C12Q 1/68 |
| 2021/0108192 | A1* | 4/2021 | Mattei | A23L 33/13 |
| 2021/0108194 | A1 | 4/2021 | Roquet et al. | |
| 2021/0142868 | A1 | 5/2021 | Copin | |
| 2021/0277461 | A1 | 9/2021 | Glezer | |
| 2023/0002837 | A1* | 1/2023 | Borg | C12Q 1/6806 |
| 2023/0054038 | A1* | 2/2023 | Bhuyan | C12N 1/20 |
| 2023/0101083 | A1 | 3/2023 | Chen | |
| 2023/0101409 | A1 | 3/2023 | Chen | |
| 2024/0093317 | A1* | 3/2024 | Karlikow | C12Q 1/6853 |
| 2024/0257147 | A1* | 8/2024 | Owen | G06Q 30/0185 |

FOREIGN PATENT DOCUMENTS

| | | | |
|---|---|---|---|
| KR | 20200108149 A | 9/2020 | |
| WO | 2004063856 A2 | 7/2004 | |
| WO | 2012094492 A2 | 7/2012 | |
| WO | WO-2016114808 A1 * | 7/2016 | ........... A23L 29/045 |
| WO | 2019152862 A1 | 8/2019 | |
| WO | WO-2019157227 A1 * | 8/2019 | |
| WO | 2019183359 A1 | 9/2019 | |
| WO | 2020028955 A1 | 2/2020 | |
| WO | 2020218489 A1 | 10/2020 | |
| WO | 2021102579 A1 | 6/2021 | |

OTHER PUBLICATIONS

Muhire, et al., "SDT: A Virus Classification Tool Based on Pairwise Sequence Alignment and Identity Calculation", PLoS ONE, vol. 9, Issue 9, Sep. 2014, 8 pages.

Machine Translation of WO2020218489A1, 2020, 29 pages.

Non-Final Office Action mailed on Jun. 18, 2024, in U.S. Appl. No. 17/490,694, 25 pages.

Wheeler et al., "BLAST QuickStart," Comparative Genomics: Humana Press, vols. 1 and 2, 2007, 13 pages.

"Tagsmart", Retrieved from: https://web.archive.org/web/20210530160413/https://tagsmart.com/, Jun. 25, 2021, 2 Pages.

Berk, et al., "Rapid Visual Authentication Based on DNA Strand Displacement", In Journal of ACS Applied Materials & Interfaces, vol. 13, Issue 16, Apr. 14, 2021, pp. 19476-19486.

Doroschak, et al., "Rapid and Robust Assembly and Decoding of Molecular Tags with DNA-based Nanopore Signatures", In Journal of Nature Communications, vol. 11, Issue 1, Nov. 3, 2020, 8 Pages.

Puddu, et al., "Magnetically Recoverable, Thermostable, Hydrophobic DNA/Silica Encapsulates and Their Application as Invisible Oil Tags", In Journal of ACS Nano, vol. 8, Issue 3, Feb. 25, 2014, pp. 2677-2685.

Palluk, et al., "De Novo DNA Synthesis Using Polymerase-Nucleotide Conjugates", In Journal of Nature Biotechnology, vol. 36, Issue 7, Jun. 18, 2018, pp. 645-650.

"International Search Report and Written Opinion Issued in PCT Application No. PCT/US22/042280", Mailed Date: Jan. 5, 2023, 13 Pages.

"International Search Report and Written Opinion Issued in PCT Application No. PCT/US22/042572", Mailed Date: Dec. 15, 2022, 11 Pages.

"International Search Report and Written Opinion Issued in PCT Application No. PCT/US22/044650", Mailed Date: Dec. 21, 2022, 18 Pages.

Tang, et al., "Enzymatic Polymerization of High Molecular Weight DNA Amphiphiles That Self-Assemble into Star-Like Micelles", In Journal of Advanced Materials, vol. 26, vol. 19, May 21, 2014, pp. 3050-3054.

Anavy, et al., "Data storage in DNA with fewer synthesis cycles using composite DNA letters", Nature Biotechnology, vol. 37, 2019, 12 pages.

Hughes et al., "Synthetic DNA Synthesis and Assembly: Putting the Synthetic in Synthetic Biology", Cold Spring Harbor Laboratory Press, 2017, 18 pages.

Machine translation of KR20200108149A. Obtained Sep. 27, 2023. (Year: 2020).

Non-Final Office Action mailed on Nov. 17, 2023, in U.S. Appl. No. 17/490,694, 24 pages.

Final Office Action mailed on Jan. 6, 2025, in U.S. Appl. No. 17/490,694, 10 pages.

U.S. Appl. No. 17/490,615, filed Sep. 30, 2021.

U.S. Appl. No. 17/490,694, filed Sep. 30, 2021.

Notice of Allowance mailed on Apr. 16, 2025, in U.S. Appl. No. 17/490,694, 07 pages.

* cited by examiner

SYNTHETIC MOLECULAR TAGS FOR SUPPLY CHAIN TRACKING

BIOLOGICAL SEQUENCES

Although this application references nucleotide sequences and uses single-letter abbreviations to represent individual nucleic acid bases, it does not include any nucleotide sequences as defined in 37 C.F.R. 1.821 because there are no sequences of ten or more nucleotides.

BACKGROUND

Identifying recalled food is one important purpose for supply chain tracking. Companies face an average cost of $10 million (USD) for each food recall. More significant than brand damage, food contamination sickens more than 48 million people annually in the U.S. alone, the equivalent of 1 in 6 Americans. Tracking food items is one component of managing food safety. Items other than food may also be subject to recalls. Even in the absence of a recall, there are many reasons to create records of how items move through a supply chain.

Paper or electronic logs can be used to maintain a record of the movement of an item. However, such logs can become easily separated from the item and may not be available to everyone in the supply chain including the final customer. More recently, radio-frequency identification (RFID) tags and quick response (QR) codes have been used to tag items. RFID tags and QR codes are often placed on the item or packaging when it enters the supply chain and may only indicate the initial source of the item (e.g., a farm or factory). It is burdensome to maintain a detailed distribution history using traditional traceability technologies. Additionally, RFID tags can be easily damaged or removed and pose security vulnerabilities. Also, RFID tags and QR codes cannot be applied to objects that are too small or lack a flat, solid surface.

There are many reasons for creating a record of the movement of an item through a supply chain. However, there are deficiencies with the current technologies. Improved techniques for recording and tracking the movement of items through supply chains will have applications in many scenarios including implementing food recalls. The following disclosure is made with respect to these and other considerations.

SUMMARY

This disclosure provides synthetic molecular tags to track movement of items through a supply chain. The synthetic molecular tags may be made of polynucleotides such as deoxyribonucleic acid (DNA). Synthetic molecular tags are applied to the item at various locations in a supply chain. There may be a unique synthetic molecular tag for each site in the supply chain. Thus, the multiple synthetic molecular tags on an item provide a record of the sites in the supply chain that the item passed through. This enables tracking of the origin, distribution history, treatment, and other related information for the item.

Correlation between the sequences of individual synthetic molecular tags and sites in the supply chain may be stored in an electronic record such as a cloud-based database. The sequences of synthetic molecular tags obtained from the item can be compared to the electronic record to identify how the item moved through the supply chain. In response to receiving the sequences of the synthetic molecular tags on an item, computer systems associated with the electronic record may provide a list or map showing the sites in the supply chain.

If any of the sites in the supply chain are linked to a product recall, that information may also be stored in the electronic record. Identification that an item has passed through a site in the supply chain linked to a product recall may be used to trigger a recall of that item. The computer systems associated with the electronic record may return an indication that the item is a recalled item. This may help companies take pre-emptive action to avoid the distribution and sale of contaminated food or other items that should be recalled.

Synthetic molecular tags such as those made from polynucleotides provide a unique solution for tracking movement of items through a supply chain because of their nanoscale-size and non-toxicity. This makes it possible to apply synthetic molecular tags directly to almost any food item including small items, powders, and liquids because the synthetic molecular tags themselves can be edible. The synthetic molecular tags may also be applied to packaging. Recent advances in technology for DNA sequencing, such as nanopore sequencing, allows the sequence of polynucleotides to be read with a small portable device that can be connected to a standard laptop computer. With their small footprint, these readers could be deployed in any part of a supply chain. It is even possible that end-user customers could read synthetic molecular tags themselves and determine the origin and movement of an item before purchasing or consuming the item.

This Summary is provided to introduce a selection of concepts in a simplified form that are further described below in the Detailed Description. This Summary is not intended to identify key features or essential features of the claimed subject matter nor is it intended to be used to limit the scope of the claimed subject matter. The term "techniques," for instance, may refer to system(s) and/or method(s) as permitted by the context described above and throughout the document.

BRIEF DESCRIPTION OF THE DRAWINGS

The Detailed Description is set forth with reference to the accompanying figures. In the figures, the left-most digit(s) of a reference number identifies the figure in which the reference number first appears. The use of the same reference numbers in different figures indicates similar or identical items. The figures are schematic representations and items shown in the figures are not necessarily to scale.

DETAILED DESCRIPTION

Figure 1:
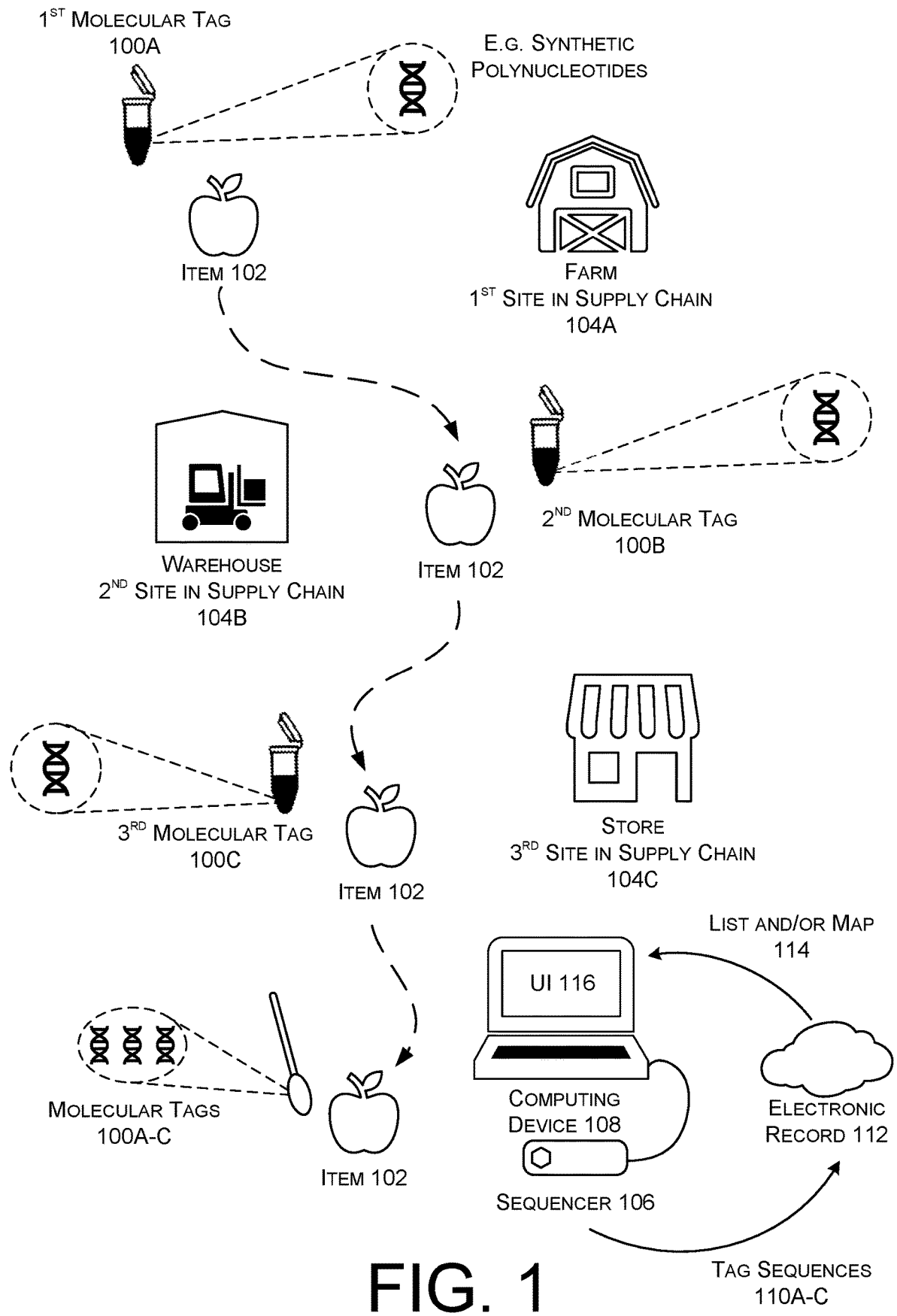
FIG. 1 illustrates use of synthetic molecular tags to create a record of movement of an item through a supply chain.

FIG. 1 shows the use of synthetic molecular tags 100 to label an item 102 with indicators of sites in a supply chain 104 that the item 102 has passed through. This creates a molecular record on the item 102 that can be read to determine how the item 102 moved through the supply chain. In some implementations, the synthetic molecular tags 100 can be used to determine that the item 102 was present or came from a site in the supply chain 104 associated with a recall. The item 102 could then itself be identified as a recalled item and removed from commerce.

The item 102 may be any type of tangible item such as a food item or non-food item. The item 102 may be a solid item like an apple or carrot, a powdered or granular item like sugar or flour, or a liquid such as milk or wine. In some implementations, the synthetic molecular tags 100 may themselves be edible. That is, the synthetic molecular tags 100 may be formed from molecules that are safe for human consumption. Examples of edible molecules include types of molecules that are normally present in foods such as polynucleotides, proteins, and sugars. The synthetic molecular tags 100 are designed so that the sequences of the molecules (e.g., DNA or proteins) are non-natural and have no biological activity. Additionally, the total quantity of all synthetic molecular tags 100 on the item 102 may be very small relative to the quantity of similar molecules found in foods (e.g., less than 1 g, less than 1 mg, less than 1 µg, or less than 1 ng) so that any biological activity (e.g., for sugars) would result in no physiological effect in a person who consumed the synthetic molecular tags 100.

The synthetic molecular tags 100 may be implemented as polynucleotides or another type of synthetic molecule. For example, the synthetic molecular tags 100 may be formed from synthetic polymers other than polynucleotides such as sugars (e.g., complex carbohydrates) or proteins. In some implementations, the synthetic molecular tags 100 may be made from nucleic acid analogs that have different structures (e.g., different backbones) than natural polynucleotides such as peptide nucleic acids (PNA), glycol nucleic acid (GNA), threose nucleic acid (TNA). Polynucleotides, as used herein, include both DNA, ribonucleic acid (RNA), and hybrids containing mixtures of DNA and RNA. DNA and RNA include nucleotides with one of the four natural bases cytosine (C), guanine (G), adenine (A), thymine (T), or uracil (U) as well as unnatural bases, noncanonical bases, and modified bases.

The synthetic molecular tags 100 may be double-stranded polynucleotides such as, for example, double-stranded DNA. The synthetic molecular tags 100, if implemented as polynucleotides, will have non-natural sequences that may be predetermined in advance of creating the synthetic molecular tags 100. The sequences of the synthetic polynucleotides are not derived from natural or biological sources. Thus, the sequences of the synthetic molecular tags 100 will differ from any polynucleotides sequences that may be naturally present on the item 102 or found in the environment.

The polynucleotides used as synthetic molecular tags 100 may have any length. Typically, they will be at least about 10 nucleotides long. The polynucleotides may be created by phosphoramidite synthesis in which the length of the polynucleotides will be less than about 300 nucleotides. Thus, the length of the polynucleotides may be about 10-300 nucleotides, such as about 100 nucleotides or about 200 nucleotides. The polynucleotides may be created by enzymatic synthesis which case the length may be up to about 10,000 nucleotides. Thus, the length of the polynucleotides may be about 10-10,000 nucleotides, such as about 300 nucleotides, about 400 nucleotides, or about 1000 nucleotides.

Any currently known or later developed techniques for polynucleotides synthesis may be used to create the synthetic molecular tags 100. Methods for polynucleotide synthesis include solid-phase phosphoramidite synthesis, microchip-based oligonucleotide synthesis, ligation-mediated assembly, polymerase chain reaction (PCR)-mediated assembly, and the like. Examples of polynucleotide synthesizers 106 include ABI 394 DNA Synthesizer (Applied Biosystems, Foster City, Calif.), the Piezoelectric Oligonucleotide Synthesizer and Microarrayer (POSAM), photolithographic oligoarray synthesizers, etc. Polynucleotides may also be synthesized by enzymatic processes. The enzyme terminal deoxynucleotidyl transferase (TDT) used in enzymatic polynucleotide synthesis is known to generate random sequences when provided with a mixture of nucleoside bases. See Fowler J D, Suo Z (2006) *Biochemical, Structural, and Physiological Characterization of Terminal Deoxynucleotidyl Transferase*. Chemical Reviews 106 (6): 2092-2110.

Synthesis of the synthetic molecular tags 100 may initially create single-stranded polynucleotides. If double-stranded polynucleotides are used for the synthetic molecular tags 100, strands complementary to the synthesized polynucleotides may be created by PCR to form double-stranded molecules.

Each item 102 may be labeled with a large number of copies of the same synthetic molecular tag 100. For example, the item 102 may be labeled with many thousands, millions, or billions of copies of a synthetic polynucleotide. The number of copies of a synthetic molecular tag 100 may be increased to create a large number of molecules with the same sequence. If the synthetic molecular tag 100 is a polynucleotide, any one of multiple enzymatic techniques known to those of ordinary skill in the art may be used to increase the number of copies of the polynucleotide. For example, the well-known technique of PCR may be used to exponentially amplify polynucleotides. Isothermal amplification methods may also be used. Isothermal methods typically employ unique DNA polymerases for separating duplex DNA. Isothermal amplification methods include Loop-Mediated Isothermal Amplification (LAMP), Whole Genome Amplification (WGA), Strand Displacement Amplification (SDA), Helicase-Dependent Amplification (HDA), Recombinase Polymerase Amplification (RPA), and Nucleic Acid Sequences Based Amplification (NASBA). See Yongxi Zhao, et al., *Isothermal Amplification of Nucleic Acids*, Chemical Reviews, 115 (22), 12491-12545 (2105) for a discussion of isothermal amplification techniques.

The synthetic molecular tags 100 may be placed directly onto the item 102 or placed in the item 102 if the item 102 is a powder or liquid. The synthetic molecular tags 100 may additionally or alternatively be placed on packaging that contains the item 102. The synthetic molecular tags 100 may be applied "naked" without any protection or modification. Alternatively, they may be protected with stabilizing agents or encapsulated by a protective coating. Multiple techniques for stably storing polynucleotides have been developed for storing biological samples and are known to those of ordinary skill in the art. Any suitable technique may be adapted for use with the item 102 depending on the composition of the item 102. Thus, in one implementation, naked double-stranded DNA may be placed on the item 102 as the synthetic molecular tags 100.

The synthetic molecular tag 100 may be suspended in a liquid and applied to the item 102. For example, a liquid suspension of the synthetic molecular tag 100 may be sprayed onto the item 102 or the item 102 may be dipped in a liquid containing many copies of the synthetic molecular tag 100. The liquid may be water or an aqueous solution such as a buffer solution. The synthetic molecular tag 100 may also be mixed with a liquid that will be applied to the item 102 as a part of processing that would occur independently of tagging. The synthetic molecular tag 100 may be mixed with a liquid that is used to rinse, sterilize, clean, or otherwise would be applied to the item 102 as part of the processing the item 102 goes through when moving through the supply chain. For example, the synthetic molecular tag 100 may be mixed with wax that is applied to a food item such as apples. As mentioned above, if the item 102 is a liquid or powder the synthetic molecular tag 100 may be mixed in with item 102 itself.

In the supply chain illustrated in FIG. 1, the item 102 is an apple that originates at a farm which is the first site in the supply chain 104A. The item 102 is tagged with a first synthetic molecular tag 100A at the first site in the supply chain 104A. The item 102 is then moved to a second site in the supply chain 104B illustrated as a warehouse. The item 102 is tagged with a second synthetic molecular tag 100B at the second site in the supply chain 104B. Finally, the item 102 is taken to a third site in the supply chain 104C shown here as a store such as a grocery store or retail location where the item 102 may be sold to a customer. The item 102 is tagged with a third synthetic molecular tag 100C at the third site in the supply chain 104C. Thus, the item 102 is tagged with a different synthetic molecular tag 100 at each site in the supply chain 104. However, a supply chain may include one or more sites at which a synthetic molecular tag 100 is not applied to the item 102. A supply chain may have as few as two unique sites 104 or more sites than illustrated in FIG. 1.

Each of the synthetic molecular tags 100A-C applied to the item at the sites in the supply chain 104A-C have unique sequences. Thus, each of the synthetic molecular tags 100A-C uniquely identifies a single one of the sites in the supply chain 104A-C. If implemented as polynucleotides, each of the synthetic molecular tags 100A-C will have a unique nucleotide sequence. The same synthetic molecular tag 100 (i.e., tags with the same sequence) can be applied to all items 102 that pass through one of the sites in the supply chain. For example, all items 102 that are stored at the second site in the supply chain 104B (warehouse) may be tagged with the second synthetic molecular tag 100B. In some implementations, a single site in the supply chain 104 may use multiple synthetic molecular tags 100. For example, different types of items 102 may be labeled with synthetic molecular tags 100 having different sequences such as a first tag for apples and a second tag for pears. As a further example, a different synthetic molecular tag 100 could be used for different time periods such as different days. For example, all apples that enter the warehouse on Monday may receive a synthetic molecular tag 100 with a different sequence than the apples that enter the warehouse on Tuesday.

The synthetic molecular tags 100A-C on the item 102 may be collected to identify which sites 104 in the supply chain the item 102 passed through. The synthetic molecular tags 100A-C may be collected from the item 102 by swabbing the surface, removing a portion of the item 102 and extracting the synthetic molecular tags 100A-C from the item 102, rinsing the item 102, and extracting the synthetic molecular tags 100A-C from the rinse solution, or by another technique. Many techniques and commercial kits for collecting, purifying, preparing molecules for analysis are known to those of ordinary skill in the art. For example, techniques developed for environmental or forensic samples of polynucleotides may be used to collect and process the synthetic molecular tags 100A-C collected from the item 102. See Hinlo R., Gleeson D., Lintermans M., Furlan E. (2017) *Methods to maximise recovery of environmental DNA from water samples*. PLOS ONE 12 (6) and Butler, John M. *Forensic DNA Typing-Biology, Technology, and Genetics of STR Markers*" Second Edition, Elsevier Academic Press, Burlington, MA (2005).

The synthetic molecular tags 100A-C collected from the item 102 and appropriately prepared are provided to a sequencer 106 and sequenced to obtain the sequences of the synthetic molecular tags 100A-C. In some implementations, the synthetic molecular tags 100A-C may be synthetic polynucleotides that can be processed by techniques known to those of ordinary skill in the art for preparing polynucleotide samples for sequencing. For example, polynucleotides collected from the item 102 may be cleaned or have impurities removed. The number of copies of the synthetic polynucleotides may be further increased by techniques such as PCR.

The sequencer 106 may be any type of device that can detect the nucleotide base sequence of polynucleotides. In some implementations, the sequencer 106 may be a nanopore sequencer. Nanopore sequencing reads the sequence of nucleoside bases on a single-stranded oligonucleotide by passing the oligonucleotide through a small hole of the order of 1 nanometer in diameter (a nanopore). Immersion of the nanopore in a conducting fluid and application of a potential across the nanopore results in a slight electrical current due to conduction of ions through the nanopore. The amount of current that flows through the nanopore is sensitive to the size of the nanopore. As an oligonucleotide passes through a nanopore, each nucleotide base obstructs the nanopore to a different degree. This results in a detectable change in the current passing through the nanopore allowing detection of the order of nucleoside bases in an oligonucleotide. See Branton, Daniel, et al. "The potential and challenges of nanopore sequencing." *Nanoscience and technology: A collection of reviews from Nature Journals* (2010): 261-268. One example of a nanopore sequencer is the Oxford Nanopore MinION® sequencer.

The sequencer 106 may also be implemented as any other type of polynucleotide sequencer such as a sequencer that performs sequencing by synthesis (e.g., Illumina® sequencing) SMRT sequencing, SOLID sequencing, 454 sequencing, etc.

The sequencer 106 may be connected to a computing device 108. The computing device 108 may be any type of conventional computing device such as a laptop computer, a desktop computer, a tablet, or the like. In some implementations, the sequencer 106 and the computing device 108 may be integrated into a single device. The sequencer 106 and the computing device 108 may be operated by a user at any of the sites 104 in the supply chain or after the item 102 has been removed from the supply chain.

The sequencer 106 together with the computing device 108 generates one or more electronic files representing the order of nucleoside bases in the synthetic molecular tags 100A-C. These sequences output from the sequencer 106 are referred to as tag sequences 110A-C. The tag sequences 110A-C are provided to the electronic record 112. In some implementations, the computing device 108 connected to the sequencer 106 is in communicative connection with the electronic record 112 and any associated computing devices via a network such as the Internet.

The sequences of each synthetic molecular tag 100 are known when the synthetic molecular tag 100 is created. The association between a specific synthetic molecular tag 100 and a site in the supply chain is determined by the synthetic molecular tag 100 used at the particular site 104. Sequences of the synthetic molecular tags 100 and associations with sites in the supply chain 104 are transmitted to the electronic record 112. This may be referred to as registering an association between the sequence of the synthetic molecular tag 100 and a site in the supply chain 104. The electronic record 112 may be a database or other system for storing and organizing electronic data. In some implementations, the electronic record 112 may be maintained by one or more computing devices that are physically distant from the item 102 and the sites 104 in the supply chain. For example, the electronic record 112 may be maintained by a network server or in a "cloud" implementation maintained in redundant format by multiple different pieces of hardware connected to a network such as the Internet. The electronic record 112 may be maintained by a third party that is not directly involved in moving the item 102 through the supply chain.

The multiple tag sequences 110A-C may include representations of nucleotide bases or they may be output from the sequencer 106 is not yet been resolved to individual nucleotide bases. Thus, the tag sequences 110A-C sent to the electronic record 112 from a local computing device proximate to the sequencer 106 may be raw sequencer output rather than a string of nucleotide bases or a sequence of another type of molecule. The "base calling" or other operations to determine the molecular sequence may be performed by one or more computing devices in the cloud that are physically remote from the sequencer 106.

The tag sequences 110 from the sequencer 106 are compared to the sequences stored in the electronic record 112. The comparison is used to identify the sites 104 in the supply chain where the item 102 was tagged. This comparison and identification of sites 104 in the supply chain may be performed by the electronic record 112 or computing devices associated with the electronic record 112. For example, computing devices and resources in the cloud may be used to perform the comparison. In other implementations, a local device such as the computing device 108 connected to the sequencer 106 may make the comparison.

The results of the comparison to the electronic record 112 may be returned to the computing device 108 as a list and/or map 114 indicating all the sites 104 in the supply that were identified from the synthetic molecular tags 100A-C collected from the item 102. The list and/or map 114 may be displayed on a user interface (UI) 116 of the computing device 108. In some implementations, the computing device 108 that displays the list or map 114 may be physically proximate to the item 102. For example, the computing device 108 may, but is not necessarily, the same computing device 108 that provided the tag sequences 110A-C to the electronic record 112. The UI 116 may show a list or map identifying the first site 104A (farm), the second site 104B (warehouse), and the third site 104C (store). If any of the sites 104 is associated with a product recall, that may also be part of the electronic record 112. The item 102 can be identified as a recalled item if it has a synthetic molecular tag 100 from the site 104 that is associated with the recall. The status of the item 102 as a recalled item may also be displayed on the UI 116. The UI 116 may or may not display which of the supply chain sites 104 triggered the characterization of the item 102 as a recalled item.

Figure 2:
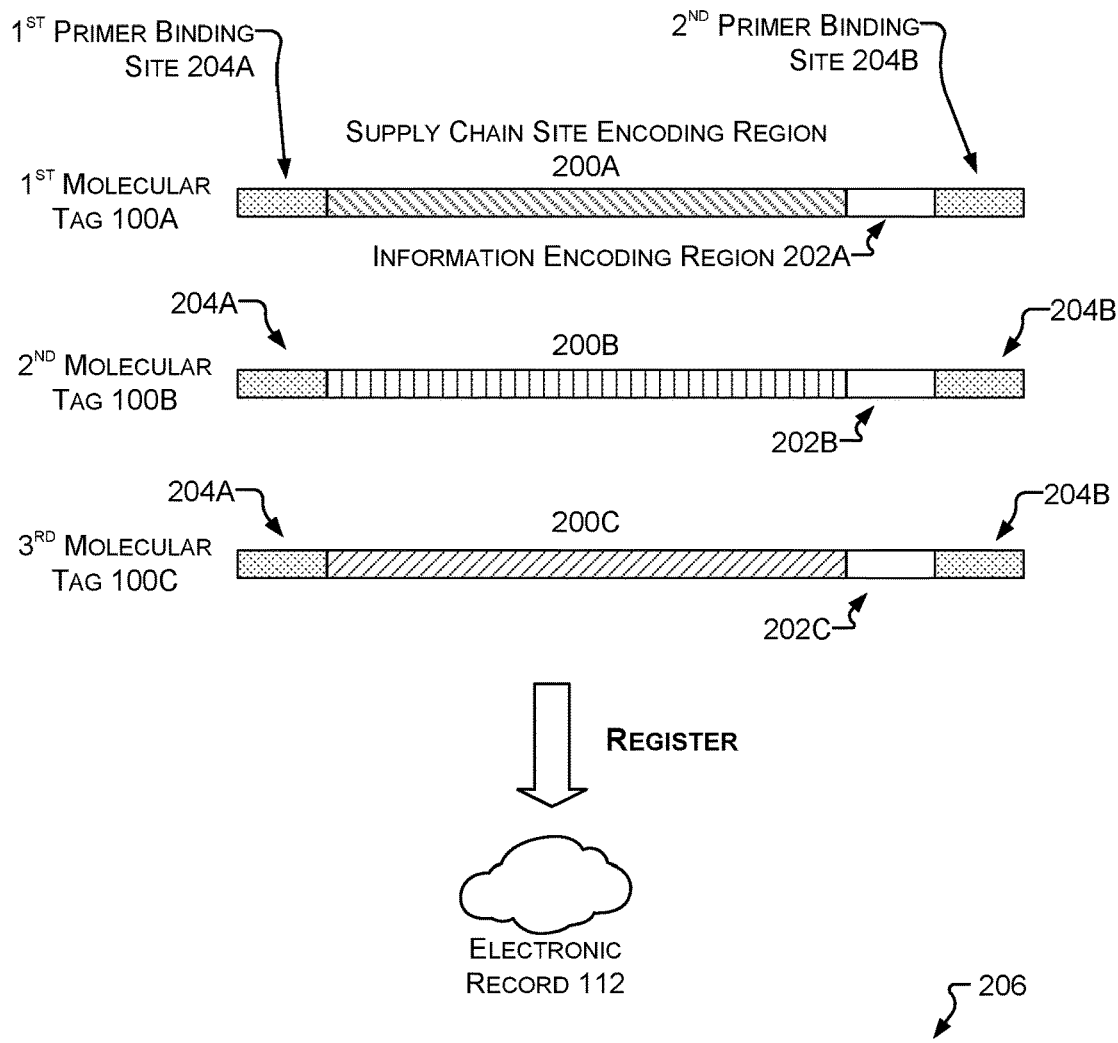
FIG. 2 illustrates example structures of synthetic molecular tags and entries in an electronic record associating sequences of synthetic molecular tags with sites in a supply chain.

FIG. 2 shows illustrative structures of the synthetic molecular tags 100A-C introduced in FIG. 1. In some implementations, the synthetic molecular tags 100A-C are synthetic polynucleotides such as, for example, double-stranded DNA. Each polynucleotide may include a supply chain site encoding region 200. This portion of the synthetic molecular tag 100 contains a sequence of nucleotides that represents one of the sites 104 in the supply chain. Each of the supply chain site encoding regions 200A-C in synthetic molecular tags 100A-C has a unique sequence of nucleotides that is different from the other supply chain site encoding regions 200A-C. The supply chain site encoding region 200 may be any length that is sufficient to encode information representing multiple different sites 104 in a supply chain. For example, the supply chain site encoding region 200 may contain between about 5-250 nucleotides such as about 10, 20, 30, 40, 50, 100, 150, 200, or 250 nucleotides. In some implementations, such as polynucleotides created by enzymatic synthesis, the supply chain site encoding region 200 may be more than 250 nucleotides long.

The supply chain site encoding regions 200 may be designed to maximize the orthogonality of the sequences with respect to each other. Increased orthogonality between supply chain site encoding regions 200 increases the differences of the respective sequences so that it is easier to discriminate between them. The similarity or difference between two supply chain site encoding regions 200 may be measured by any technique for comparing two strings such as edit distance. The difference may be maximized by selecting sequences for the supply chain site encoding regions 200 that are as different from each other as possible for a given number of sites 104 in the supply chain. The sites 104 do not necessarily have to all be in the same supply chain. For example, a set of 10,000 different supply chain site encoding regions 200 could be designed for use in identifying supply chain sites 104 across multiple different supply chains. Each of the 10,000 different supply chain site encoding regions 200 would then be designed to be as different as possible from the others.

For example, if there are four unique sites 104 in the supply chain, the four supply chain site encoding regions 200 may be represented each as a sequence that includes only a single nucleotide-AAAA, GGGG, CCCC, and TTTT. The high orthogonality between these four sequences makes it easy to distinguish between them even if there are errors. Other rules may also be applied when designing the sequences of the supply chain site encoding regions 200 such as avoiding homopolymers or avoid sequences that hybridize with primers. Thus, the sequences of the supply chain site encoding regions 200 may be designed to maximize orthogonality between the sequences given the number of unique sites 104 that are encoded, the length of the supply chain site encoding regions 200, and one or more additional rules for sequence design.

The synthetic molecular tags 100 can include information encoding regions 202 that encode information beside the identity of a supply chain site. The information encoding regions 202 may contain information such as the type of item. Thus, all items 102 of a particular type that pass through a site in the supply chain will receive the same synthetic molecular tag 100. Different types of items will receive a synthetic molecular tag 100 that includes the same supply chain site encoding region 200 but has a different information encoding region 202. For example, the sequence AGAGA in the information encoding region 202 could represent pears while the sequence TCTCTC in the information encoding region 202 would represent apples. Similarly, types of items 102 distinguished by different synthetic molecular tags 100 may be other features such as quality or aesthetics of otherwise similar items 102. For example, different synthetic molecular tags 100 could be applied to different grades of apples such as extra fancy, fancy, or utility. Thus, a synthetic molecular tag 100 may encode identity of a supply chain site as well as any other characteristic of the item 102.

An information encoding region 202 may contain other information besides the type of an item such as a time period such as a date. Thus, the sequences of at least a portion of the information encoding region 202 in a synthetic molecular tag 100 may be changed based on time. For example, the information encoding region 202 may encode a date, a week of the year, a month, a year, or another time period. The date may be used to determine freshness of an item 102. For example, in item 102 could be determined to be "fresh" if the current date is less than a threshold number of days after the date encoded in the synthetic molecular tag 100. An information encoding region 202 may include multiple types of information such as the type of an item and a date. Thus, a synthetic molecular tag 100 may indicate in addition to a site in the supply chain a type of item and a date the item passed through the site in the supply chain. An information encoding region 202 may be any length within the constraints of the total length of the synthetic molecular tag 100. An information encoding region 202 may be, but is not necessarily, shorter than a supply chain site encoding region 200A.

Alternatively, a combinatorial encoding method may be used to create a "barcode" in the synthetic molecular tags 100 that can represent any or all of a site in the supply chain, a type of item, a date the item passed through the site, and possible additional information. Thus, the supply chain site encoding region 200 and the information encoding region 202 may be replaced by a barcode encoding region. The value of combinatorial encoding is the ability to represent multiple different pieces of information with fewer unique synthetic molecules. One technique for encoding combinatorial barcodes in DNA is provided in Doroschak, K. et al. *Rapid and robust assembly and decoding of molecular tags with DNA-based nanopore signatures*. Nat Commun 11, 5454 (2020).

With this technique, digital bit is represented by the presence/absence of a unique sequence. Sequences of digital bits (i.e., barcode sequences) are mapped to specific values such as the name of a site in a supply chain or a date in the electronic record 112. Thus, any arbitrary sequence of digital bits can be linked to any other type of information. The number of barcodes that can be represented combinatorically is the power of two of the number of sequences. For example, to represent 1 million supply chain sites, only 1,000 synthetic molecules are needed. Thus, the cost of synthesis is significantly reduced compared to the cost synthesizing 1 million unique synthetic molecular tags 100. As a further example, only 9 unique sequences are able to encode the information of 365 days.

The synthetic molecular tags 100 may also include one or more primer binding sites 204 designed to hybridize with PCR primers. Techniques for designing PCR primers and techniques for evaluating the suitability of primer sequences are well known to persons of ordinary skill in the art. In some implementations, a synthetic molecular tag 100 may include a first primer binding site 204A on a 3'-end and a second primer binding site 204B on a 5'-end. The first primer binding site 204A may be a forward primer binding site and the second primer binding site 204B may be a reverse primer binding site or vice versa. The primer binding sites may be of any length that allows a primer to hybridize and are typically shorter than the supply chain site encoding region 200. For example, the primer binding sites 204 may be between about 10-40 nucleotides long such as, for example, about 10, about 20, about 30, or about 40 nucleotides long.

In some implementations, all of the synthetic molecular tags 100A-C may have the same forward and reverse primer binding sites. This makes it possible to use a single set of primers to PCR amplify the entire set of synthetic molecular tags 100A-C collected from the item. In an implementation, the forward and reverse primer sites are the same for all the synthetic molecular tags 100 in the same supply chain but different forward and reverse primer sites are used for the synthetic molecular tags 100 in a different supply chain. For example, if 10,000 (or other number) of supply chain site encoding regions 200 are designed, they may be combined with a different set of forward and reverse primer binding sites for each of the multiple different supply chains.

A total length of a synthetic molecular tag 100, and thus a length of the supply chain site encoding region 200 and the information encoding region 202, may depend on the technique used to synthesize the polynucleotides. Phosphoramidite synthesis can synthesize polynucleotides accurately to a maximum length of about 300 nucleotides. See Palluk, S., Arlow, D. H., Rond, T., de, Barthel, S., Kang, J. S., et al. (2018). De novo *DNA synthesis using polymerase-nucleotide conjugates*. Nat. Biotechnol. 36, 645-650. Thus, the random sequences 200 may have a length of about 100-300 nucleotides, about 100 nucleotides, about 150 nucleotides, about 200 nucleotides, about 250 nucleotides, or about 300 nucleotides. Improvements in phosphoramidite synthesis technology may increase this maximum length above 300 nucleotides.

Enzymatic polynucleotide synthesis can create polynucleotides that are many thousands of nucleotides long. See Tang L, Tjong V, Li N, Yingling Y G, Chilkoti A, & Zauscher S (2014). *Enzymatic polymerization of high molecular weight DNA amphiphiles that self-assemble into star-like micelles*. Advanced Materials, 26 (19), 3050-3054. Synthetic molecular tags 100 synthesized by enzymatic synthesis may have a range of lengths due to variations in the number of polynucleotides incorporated at different strands by the enzymatic synthesis process. Thus, synthetic molecular tags 100 synthesized by an enzymatic method may be described as having one average length although there will be variations in length for some of the individual polynucleotides. In some implementations, the average length of the synthetic molecular tags 100 is greater than about 400 nucleotides. For example, the average length of the synthetic molecular tags 100 may be about 1000 nucleotides, about 5000 nucleotides, about 10,000 nucleotides, or another length greater than 400 nucleotides.

Once the synthetic molecular tags 100A-C are designed, each of the synthetic molecular tags 100A-C may be assigned to a different one of the sites 104A-C in the supply chain. The sequences of the synthetic molecular tags 100A-C, or at least a portion of the sequences such as some or all of the supply chain site encoding regions 200A-C, may be registered in the electronic record 112 together with the associated supply chain site 104A-C. In an example implementation, the supply chain site encoding regions 200A-C are registered in the electronic record 112 but the primer binding sites 204A and 204B are not.

Table 206 shows examples of three entries in the electronic record 112. As described above, the electronic record 112 may be maintained on one or more network-accessible computing devices at one or more locations physically distant (i.e., a cloud-based system) from the item 102 and the supply chain sites 104. The electronic record 112 may include entries for multiple different supply chain sites including for multiple different supply chains. In some implementations, the electronic record 112 may be implemented as a list, a table, an array, a spreadsheet, a database, or another data structure.

Each entry in the electronic record 112 includes a reference sequence 208. Each reference sequence 208 is a sequence used to uniquely recognize a synthetic molecular tag 100. The reference sequences 208A-C may be in any electronic format used for storing representations of the synthetic molecular tags 100. If the synthetic molecular tags 100 are polynucleotides, the reference sequences 208A-C may be in any format used to store polynucleotide sequences such as American Standard Code for Information Interchange (ASCII) or FASTA. Although only three partial sequences are shown in table 206, there may be a greater number of reference sequences 208 and the reference sequences 208 may be longer or shorter than shown. A reference sequence 208 may represent the sequence of all or only a portion of the synthetic molecular tag 100.

Each entry in the electronic record 112 also includes a description of a supply chain site 104. The association between a reference sequence 208 and corresponding description of a supply chain site 104 may be any type of association used for associating, linking, correlating, labeling, etc. items in a data record. The descriptions of a supply chain site 210 may include a name for the site, an address, geocoordinates, and/or any other type of description that can be used to uniquely identify the supply chain site 104. In the electronic record 112, each of the reference sequences 208 is uniquely associated with one description of a supply chain site 104.

If a supply chain site 104 is linked to a product recall, there may be an indication 212 such as a flag in the description of that supply chain site 210. For example, in FIG. 2, the description of the supply chain site 210B for the warehouse includes an indication 212 that the warehouse is associated with a recall. A product recall may be linked or otherwise associated with a supply chain site 104 for any number of reasons such as identification of contaminated food products at that site, discovery of deviations from established storage or handling procedures at that site, identification of manufacturing defects at that site, or the like.

The electronic record 112 may also include a description of where the synthetic molecular tags 100A-C are located on the item 102. For example, the electronic record 112 may indicate that the synthetic molecular tags 100A-C were placed on the outside surface of the item 102 or on the packaging of the item. If the item 102 is liquid or a powder, the electronic record 112 may indicate that the synthetic molecular tags 100A-C are included in the liquid/powder rather than on packaging. In some implementations, all synthetic molecular tags 100A-C are placed at the same location on the item 102. In some implementations, different ones of the synthetic molecular tags 100A-C may be placed at different locations on the item 102. Providing the location of the synthetic molecular tags 100 in the electronic record 112 can guide collection of the synthetic molecular tags 100A-C.

Figure 3:
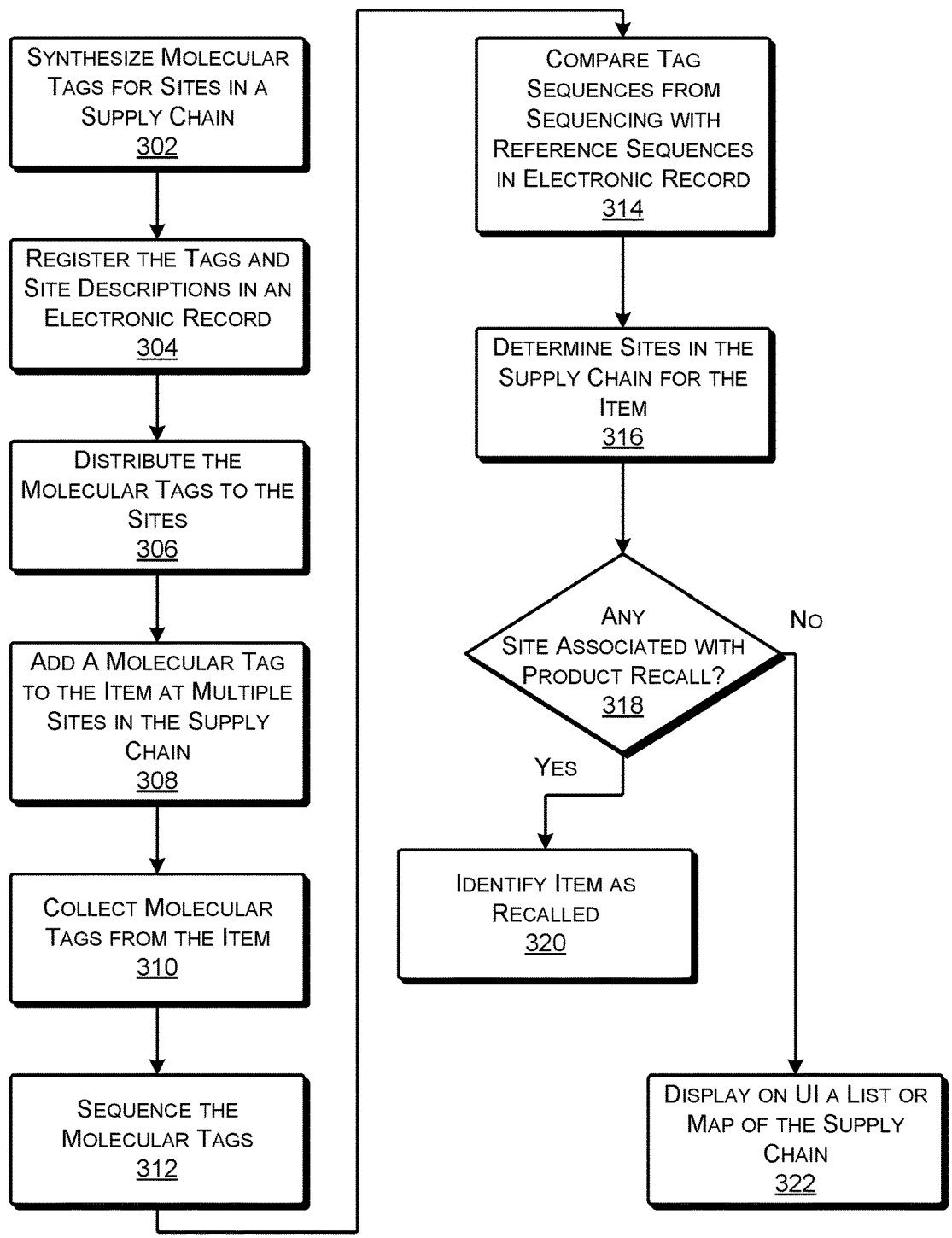
FIG. 3 is a flow diagram showing an illustrative process for using synthetic molecular tags to track movement of an item through a supply chain and identify recalled items.

FIG. 3 shows an illustrative process 300 for using synthetic molecular tags to track movement of an item through a supply chain and identify if the item is a recalled item.

At operation 302, synthetic molecular tags for sites in a supply chain are synthesized. A plurality of copies of each synthetic molecular tag may be created so that a single molecule is not relied upon to indicate that the item passed through as site in the supply chain. A different, synthetic molecular tag may be synthesized for each supply chain site. Thus, the synthesis may create at least a plurality of copies of a first synthetic molecular tag and a plurality of copies of a second synthetic molecular tag. The synthetic molecular tags may be edible. For example, the synthetic molecular tags may be formed from polynucleotides, polypeptides, or complex carbohydrates.

The synthetic molecular tags may be formed from molecules that are similar to natural polynucleotides such as peptide nucleic acids (PNA), glycol nucleic acid (GNA), threose nucleic acid (TNA). Peptide nucleic acids are synthetic mimics of DNA in which the deoxyribose phosphate backbone is replaced by a pseudo-peptide polymer to which the nucleobases are linked. The procedures for PNA synthesis are similar to those employed for peptide synthesis, using standard solid-phase manual or automated synthesis. (Nielsen P E, et al. *Sequence-selective recognition of DNA by strand displacement with a thymine-substituted polyamide.* Science 1991; 254:1497-1500.) Glycol nucleic acid, sometimes also referred to as glycerol nucleic acid, is a nucleic acid similar to DNA or RNA but differing in the composition of its sugar-phosphodiester backbone. GNA's backbone is composed of repeating glycol units linked by phosphodiester bonds. See U.S. Pat. No. 5,886,177 for a description of GNA. Threose nucleic acid is an artificial genetic polymer in which the natural five-carbon ribose sugar found in RNA has been replaced by an unnatural four-carbon threose sugar. TNA oligonucleotides were first constructed by automated solid-phase synthesis using phosphoramidite chemistry. Methods for chemically synthesized TNA monomers (phosphoramidites and nucleoside triphosphates) have been heavily optimized to support synthetic biology projects aimed at advancing TNA research. (Su Zhang, John C. Chaput, *Synthesis of Threose Nucleic Acid (TNA) Phosphoramidite Monomers and Oligonucleotide Polymers*, Curr. Protoc. Nucleic Acid Chem. 50:4.51.1-4.51.26 (2012).)

The specific technique used for synthesizing the synthetic molecular tags depends on the type of molecule. If the synthetic molecular tags are polynucleotides, the polynucleotide may be synthesized by any known or later developed technique that creates DNA or RNA strands with specific sequences. Examples of techniques for synthesizing polynucleotides include phosphoramidite synthesis and enzymatic synthesis.

If the synthetic molecular tags are proteins, the proteins may be synthesized by any known or later developed technique for creating proteins with specific sequences of amino acids. One technique for synthesizing proteins is solid-phase peptide synthesis (SPPS). See Coin, I., et al. Solid-phase peptide synthesis: from standard procedures to the synthesis of difficult sequences. *Nat Protoc* 2, 3247-3256 (2007) for a description of SPPS. If the synthetic molecular tags are sugars, the sugars may be synthesized by any known, or later developed technique for synthesis of oligosaccharides. For a discussion of automated synthesis of complex carbohydrates see Van Noorden, R. Sugar synthesis speeds up. *Nature* 466, 1029 (2010).

Each synthetic molecular tag may include a plurality of synthetic molecules. The original synthesis may create many copies of the synthetic molecular tag with the same sequence. Additionally or alternatively, the one or more copies of the synthetic molecular tag created by synthesis may be copied to further increase the number of molecules with that same sequence. For example, synthetic polynucleotides may be copied by PCR to increase the number of copies. Each synthetic molecular tag may include a large number of molecules with the same sequence such as many thousands, tens of thousands, hundreds of thousands, millions, or billions of individual molecules.

A length of each of the synthetic polynucleotides may be between approximately 50 nucleotides and approximately 10,000 nucleotides. In some implementations, the synthetic polynucleotides may be synthesized by phosphoramidite synthesis, and a length of the synthetic polynucleotides may be about 100-300 nucleotides. In some implementations, the synthetic polynucleotides may be synthesized by enzymatic synthesis, and an average length of the synthetic polynucleotides may be greater than 400 nucleotides such as between about 400 and 10,000 nucleotides. Sequences with lengths shorter than 400 nucleotides may also be synthesized by enzymatic synthesis.

The synthetic molecular tags if implemented as polynucleotides may also include one or more primer binding sites. The primer binding sites may be used for PCR amplification of the polynucleotides. The primer binding sites may be located at one or both ends (e.g., 3' end and/or 5'end) of the synthetic polynucleotides. The primer binding sites may be a forward primer binding site and a reverse primer binding site. In some implementations, each of the polynucleotides uses as synthetic molecular tags for a given supply chain may have the same forward and reverse primer binding sites. Thus, all the synthetic molecular tags applied to an item can be amplified with the same pair of primers. Design and use of polynucleotide primers for amplifying or increasing the copy number of polynucleotides are well known to persons of ordinary skill in the art. A length of the primer binding sites may be about 10-30 nucleotides and the sequences may be designed using software and conventional techniques. Techniques for primer design are known to those of ordinary skill in the art.

At operation 304, sequences of synthetic molecular tags and descriptions of sites in the supply chain are registered in an electronic record. The registration may consist of creating an entry in the electronic record that links or otherwise associates at least a portion (e.g., a supply chain site encoding region) of a synthetic molecular tag sequence and a description of one of the sites in the supply chain. The portion of the synthetic molecular tag that is registered in the electronic record is referred to as a reference sequence. For example, an association between at least a portion of a reference sequence of a first synthetic molecular tag and a description of a first site in the supply chain as well as an association between at least a portion of a reference sequence of a second synthetic molecular tag and a description of a second site in the supply chain may be registered in the electronic record. If, for example, the synthetic molecular tags are polynucleotides at least a portion of the sequence of each of the polynucleotides can be uniquely associated in the electronic record with a description of a respective one of the sites in the supply chain.

The electronic record may also include an indication that one or more sites in the supply chain are linked to a product recall. This indication may be added when the association between sequences of the synthetic molecular tags and descriptions of sites in the supply chain are added to the electronic record. Alternatively, the indication of a recall may be added after the electronic record has been created. For example, the indication of a recall can be added to the electronic record after reasons for a recall have been identified.

The electronic record may also indicate where the synthetic molecular tags are placed on or in the item. The electronic record may be a database, spreadsheet, table, list, or other data structure configured to store the synthetic molecular tag sequences and the description of a site in the supply chain. The electronic record may be maintained on a network-accessible computing device that is physically distant from the item and any of the sites in the supply chain. In an implementation, the electronic record may be maintained in a cloud-based system.

At operation 306, the synthetic molecular tags synthesized at operation 302 may be distributed to the respective supply chain sites. Thus, a plurality of copies of each of the plurality of synthetic molecular tags can be distributed to the respective sites in the supply chain. Each site in the supply chain receives, of course, the synthetic molecular tags that are associated with that site in the electronic record. In some implementations, all the synthetic molecular tags for one or more supply chains are synthesized at a central location. Then the synthetic molecular tags assigned to each supply chain site may be distributed to those sites. For example, a plurality of copies of a first synthetic molecular tag may be distributed to a first site in a supply chain and a plurality of copies of a second synthetic molecular tag may be distributed to a second site in the supply chain. The synthetic molecular tags may be provided to the respective sites in the supply chain well in advance of the item moving through those sites.

At operation 308, a synthetic molecular tag is added to the item at multiple sites in the supply chain. The item may be a food item and the synthetic molecular tags may be edible so that any tags not removed from the item may be consumed with the item. Thus, in some implementations, at each site in the supply chain, the respective synthetic molecular tag associated with that site in the supply chain is added to the item. The synthetic molecular tag may be applied to the item in any number of different ways. The synthetic molecular tag may be applied to the outside of the item or to packaging containing the item. For example, the surface of the item may be contacted with a liquid solution containing a synthetic molecular tag. If the item is liquid or powder, the synthetic molecular tag may be mixed in with the item. In some implementations, the synthetic molecular tag may be placed on, in, or under a visible taggant such as a QR code or holographic sticker. The synthetic molecular tag applied to the item may be protected by a coating or encapsulating layer that can be applied together with the molecules of the tag or after the synthetic molecular tag has been applied to the item.

A different synthetic molecular tag may be applied to the item as it moves through each site in a supply chain. The synthetic molecular tags are, as described above, uniquely associated with the sites in the electronic record. This creates a molecular record on the item of the sites in the supply chain showing where the item was as it moved through the supply chain. For example, a first synthetic molecular tag may be added to the item at a first site in a supply chain and a second synthetic molecular tag with a different sequence than the first synthetic molecular tag may be added to the item at a second site in the supply chain. This may be repeated for any additional sites in the supply chain. However, there may be one or more sites in a supply chain at which synthetic molecular tags are not added to the item.

At operation 310, the synthetic molecular tags are collected from the item. A plurality of synthetic molecular tags each representing a different site in a supply chain may be collected from the item. For example, if there are two synthetic molecular tags present on the item, the first synthetic molecular tag and the second synthetic molecular tag may be collected from the item The synthetic molecular tags may be collected using any established techniques for collecting polynucleotides from environmental or forensic samples. Following collection, the synthetic molecular tags may be cleaned or processed in preparation for sequencing using commercial kits or any one of a number of techniques known to those of ordinary skill in the art.

The synthetic molecular tags may be collected from the item anytime during its movement through a supply chain or after it has left the supply chain. The synthetic molecular tags may be collected at a final site in the supply chain such as a retail location. Alternatively, the synthetic molecular tags may be collected from an item part way through a supply chain. Additionally, the synthetic molecular tags may also be collected after the item has been sold and left the supply chain.

At operation 312, at least a portion of the synthetic molecular tags collected from the item are sequenced. Sequencing the synthetic molecular tags generates a tag sequence for each synthetic molecular tag collected from the item. If, for example, there are two synthetic molecular tags collected from the item, sequencing the first synthetic molecular tag and the second synthetic molecular tag may generate a first tag sequence and a second tag sequence. The sequencing may be performed by any suitable technology that detects a sequence of monomers joined together to create the synthetic molecular tag. If the synthetic molecular tags are polynucleotides, the sequencing may be performed by any of multiple techniques known to those of skill in the art for detecting the nucleotide sequence of a polynucleotide such as sequencing by synthesis or nanopore sequencing. If the synthetic molecular tags are proteins, the sequencing may be performed by any of multiple techniques known to those of ordinary skill in the art for determining the amino acid sequence of a protein such as mass spectrometry and Edman degradation using a protein sequenator (sequencer). Synthetic molecular tags formed from sugars may be sequenced or have their structures identified using techniques known to those of ordinary skill in the art such as nuclear magnetic resonance (NMR) spectroscopy or newer techniques based on using mass spectroscopy in conjunction with other sensing technology. For discussion of carbohydrate sequencing see Schindler, B., et al. Anomeric memory of the glycosidic bond upon fragmentation and its consequences for carbohydrate sequencing. *Nat Commun* 8, 973 (2017).

The synthetic molecular tags collected from the item at operation 310, may be processed by techniques known to those of skill in the art prior to sequencing. For example, the synthetic molecular tags may be cleaned, purified, or amplified. If synthetic molecular tags are polynucleotides with primer binding sites, PCR amplification with appropriate primers may be used to increase the number of copies of the synthetic molecular tags before sequencing. As an additional example, adapters may be ligated to the ends of polynucleotides using established techniques in preparation for sequencing by synthesis.

The portion of the synthetic molecular tags that are sequenced may include at least a portion of the supply chain site encoding regions. In some implementations, the full length of the synthetic molecular tags is sequenced including any primer binding sites if present. In some implementations, only a portion of the full length of the synthetic molecular tags are sequenced. In some implementations, the portion of the synthetic molecular tags that are sequenced includes the full length of the supply chain site encoding regions.

The output generated by sequencing the synthetic molecular tags collected from the item is a plurality of tag sequences. The tag sequences are representations of the sequence of monomers in the synthetic molecular tag. If the synthetic molecular tags are nucleotides, the plurality of retrieved sequences represents the order of nucleoside bases in the polynucleotides collected from the item as detected by the sequencing system. If the synthetic molecular tags are polypeptides, the plurality of retrieved sequences represents the order of peptides in the polypeptides collected from the item as detected by the sequencing system. If the synthetic molecular tags are sugars, the plurality of retrieved sequences represents the order and structure of sugars in the complex carbohydrate collected from the item as detected by the sequencing system. The plurality of tag sequences may be represented electronically in a computer file. Sequences of the synthetic molecular tags may be characterized in ways other than traditional sequences. One technique uses toehold-mediated strand displacement in which a synthetic molecular tag displaces one strand of a double-stranded DNA structure. The displaced strand of DNA is attached to a quencher which, when removed, enables a fluorophore on the other strand to generate a fluorescent signal. Thus, presence of a synthetic molecular tag with a "correct" sequence can be visibly detected by fluorescence without sequencing the synthetic molecular tag. Multiple different strand-displacement complexes may be present such as one for each unique synthetic molecular tag synthesized at operation 302. In an implementation, nitrocellulose paper or other substrate may be coated at multiple discrete locations with the strand-displacement complexes. The pattern of fluorescence detected can be interpreted to identify the supply chain sites that the item moved through. Use of toehold-mediated strand displacement for charactering multiple message DNA strands by patterns of fluorescence is discussed in Kimberly Berk, et al., *Rapid Visual Authentication Based on DNA Strand Displacement*, ACS Appl. Mater. Interfaces (13) 19476-19486 (2021).

At operation 314, the tag sequences generated operation 312 are compared to the reference sequences in an electronic record. The comparison may be initiated by providing the reference sequences to a computing device communicatively connected to the electronic record. In some implementations, a computer file containing a plurality of reference sequences may be transmitted over a communications network such as the Internet from a computing device coupled to the sequencer to a network-based computing device that stores or maintains the electronic record. The comparison may be made by the computing device that stores or maintains the electronic record. Thus, the comparison may be done by a computing device that is located in the cloud and not by the computing device that sequenced the synthetic molecular tags. However, it is also possible that a computing device physically proximate to the item, such as the computing device that sequenced the synthetic molecular tags, may make the comparison.

The comparison may use the tag sequences to query the electronic record to identify if there are any matching reference sequences in the electronic record. For example, the comparison may include comparing a first tag sequence and a second tag sequence to the electronic record containing a first reference sequence associated with a description of a first site in the supply chain and a second reference sequence associated with a description of a second site in the supply chain.

Comparison and finding a "hit" or match between a tag sequence in one of the reference sequences in the electronic record does not require a perfect match between the two sequences. Matches over only part of the length of either sequence or matches of less than 100% sequence identity may also be considered matches. Errors can be introduced in both the synthesis and sequencing of polynucleotides. Additionally, the synthetic molecular tags may be damaged while on the item. Thus, even though it is the same molecule, the tag sequence obtained at operation 312 may be different from the reference sequence registered in the electronic record at operation 304.

In some implementations, the matching may be identified a best match between a tag sequence and one of the reference sequences in electronic record. The best match determines which of the reference sequences is most similar to the tag sequence. The best match may be determined by any technique known to those of skill in the art for comparing the similarity of two strings. For example, the best match could be the reference sequence which has the smallest edit distance, hamming distance, etc. from the tag sequence. Maximizing orthogonality between the reference sequences in the electronic record increases the dissimilarity between those sequences and thus makes it easier to unambiguously map a tag sequence to only one of the reference sequences. If two reference sequences were very similar, such as differing in only a single nucleotide, and there is a tag sequence that is similar to both but does not match either, it may be impossible to determine which is closer to the tag sequence.

At operation 316, it is determined based on the comparing at operation 314 that the item was present at one or more sites in the supply chain. Once a reference sequence is identified at operation 314, the electronic record is referenced to determine which site in the supply chain is associated with that reference sequence. This may be repeated for each unique reference sequence identified to determine which multiple sites in the supply chain that the item passed through. Thus, for example, if a first reference sequence and a second reference sequence are identified from tag sequences obtained from the item, it can be determined that the item was at a first site in the supply chain and at a second site in the supply chain based on the electronic record which links the first reference sequence to the first site and the second reference sequence to the second site.

If a first tag sequence is not identical to any reference sequence contained in the electronic record (e.g., due to errors in sequencing, synthesis, or damage to the synthetic molecular tag) it may still be determined that the item was at a first site in the supply chain which is linked to the first tag sequence in the electronic record. This determination may be based on the first tag sequence being more similar to the first reference sequence than to any of the reference sequence in the electronic record. Thus, determining which sites in a supply chain the item passed through may be based on best matches or approximate matches made during the comparison at operation 314. If a molecule that is not part of a synthetic molecular tag is sequenced, for example DNA from the environment that was present on the item, there will be no matching reference sequence in the electronic record. In order to prevent such a sequence from being erroneously matched with one of the reference sequences in the electronic record, there may be a minimum threshold of similarity required to identify a match. For example, there may be a minimal similarity of, for example, at least 50% sequence identity or an edit distance of no more than 25 to one of the reference sequences for a match to be identified.

At operation 318, it is determined by comparison to the electronic record if at least one of the synthetic molecular tags obtained from the item is associated with a site in the supply chain linked to a product recall. This may be done by determining if any of the sites in the supply chain identified at operation 316 are linked to a product recall in the electronic record. Each supply chain site in the electronic record may have a flag or indicator (e.g., true/false) that it is associated with a product recall.

In an implementation, it may be determined that the item passed through at least one site in the supply chain linked to a product recall. The determination that the item is recalled or linked to a product recall may be the same regardless of the number of sites in the supply chain that are linked to a product recall. Alternatively, if there are multiple different product recalls and the items has passed through sites in the supply chain associated with two or more different product recalls, the item may be identified as being linked to each of the separate product recalls.

If, at operation 318, it is determined that the item is associated with a product recall, process 300 may proceed along the "yes" path to operation 320. At operation 320, at least one of the sites in the supply chain for the item is linked to a product recall, the item is identified as a recalled item. The identification may or may not identify which site or sites are linked to a product recall. If two or more sites in the supply chain are each associated with a different product recall, the indication may show that the item is associated with multiple different product recalls. Or the indication may simply be a binary condition indicating that the item is either recalled or not. The indication that the item is a recalled item may be displayed on a user interface of a computing device located physically proximate to the item. In some implementations, it may be displayed on the same computing device that was used to sequence the synthetic molecular tags collected from the item.

If, at operation 318, it is determined that the item is not associated with a product recall, process 300 may proceed along the "no" path to operation 322. At operation 322, a list and/or map of the supply chain may be displayed on a UI of a computing device. The list and/or map will include the sites in the supply chain identified at operation 316. Thus, this provides information encoded by the synthetic molecular tags in human-readable form. The user interface may be that of a computing device that is physically proximate to the item such as, for example, the computing device used to sequence the synthetic molecular tags. Although shown as alternatives in illustrative process 300, the item may be identified as a recall item and a list and/or map of sites in the supply chain may both be displayed on a UI of a computing device.

Detail of procedures and techniques not explicitly described or other processes disclosed of this application are understood to be performed using conventional molecular biology techniques and knowledge readily available to one of ordinary skill in the art. Specific procedures and techniques may be found in reference manuals such as, for example, Michael R. Green & Joseph Sambrook, *Molecular Cloning: A Laboratory Manual*, Cold Spring Harbor Laboratory Press, 4th ed. (2012).

Illustrative Computer Architecture

Figure 4:
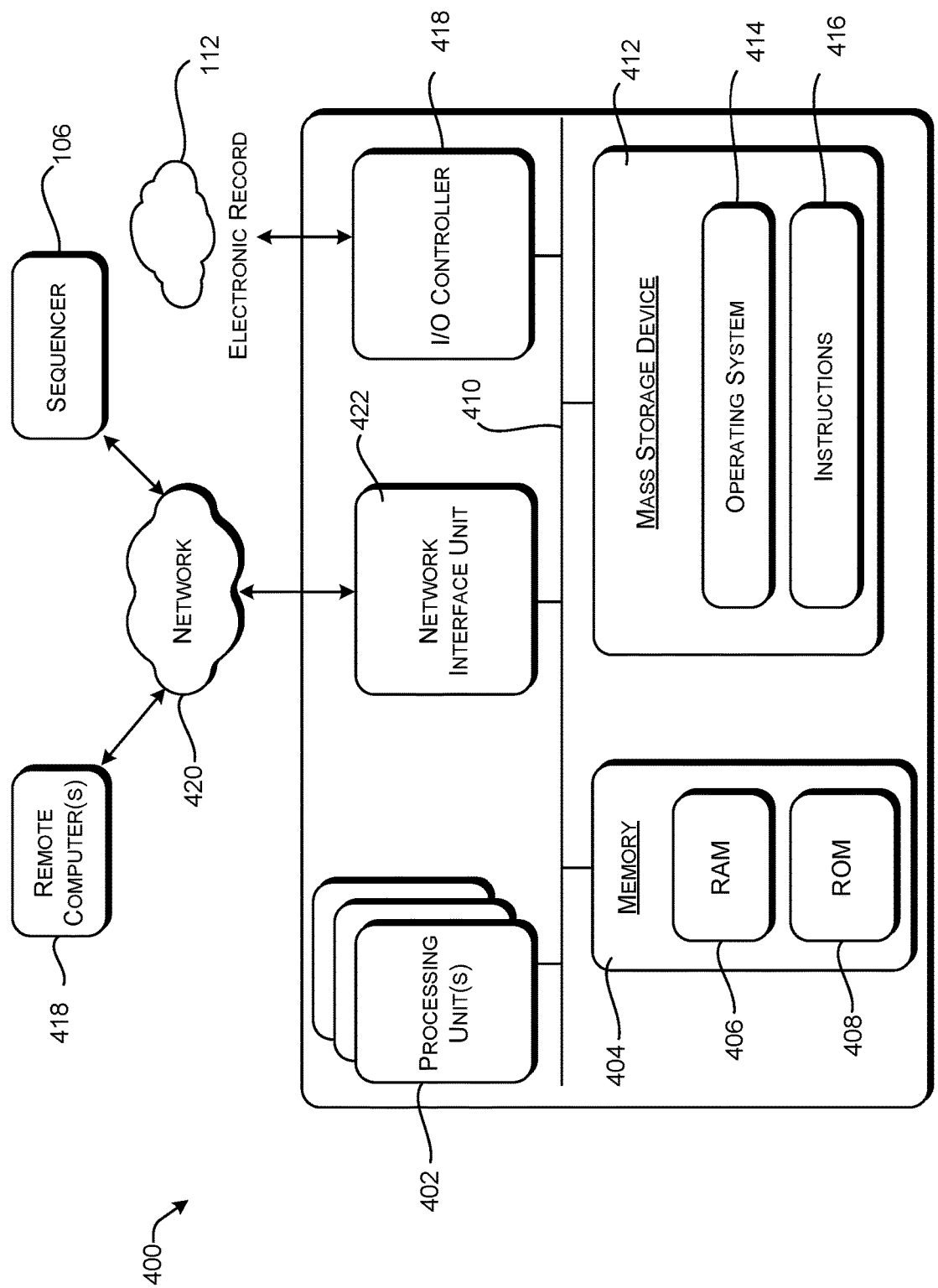
FIG. 4 is an illustrative computer architecture for implementing techniques of this disclosure.

FIG. 4 is a computer architecture diagram showing an illustrative computer hardware and software architecture for a computing device such as the computing device 108 introduced FIG. 1 or a computing device in communicative connection with the electronic record 112. In particular, the computer 400 illustrated in FIG. 4 can be utilized to receive tag sequences 110 from the sequencer 106.

The computer 400 includes one or more processing units 402, a system memory 404, including a random-access memory 406 ("RAM") and a read-only memory ("ROM") 408, and a system bus 410 that couples the memory 404 to the processing unit(s) 402. A basic input/output system ("BIOS" or "firmware") containing the basic routines that help to transfer information between elements within the computer 400, such as during startup, can be stored in the ROM 408. The computer 400 further includes a mass storage device 412 for storing an operating system 414 and other instructions 416 that represent application programs and/or other types of programs. The other programs may be, for example, instructions to compare tag sequences 110 to reference sequences 208 and determine which reference sequence 106 matches a tag sequence 110. The mass storage device 412 can also be configured to store files, documents, and data. In some implementations, electronic record 112 may be maintained in the mass storage device 412.

The mass storage device 412 is connected to the processing unit(s) 402 through a mass storage controller (not shown) connected to the bus 410. The mass storage device 412 and its associated computer-readable media provide non-volatile storage for the computer 400. Although the description of computer-readable media contained herein refers to a mass storage device, such as a hard disk, CD-ROM drive, DVD-ROM drive, or USB storage key, it should be appreciated by those skilled in the art that computer-readable media can be any available computer-readable storage media or communication media that can be accessed by the computer 400.

Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner so as to encode information in the signal. By way of example, and not limitation, communication media includes wired media such as a wired network or direct-wired connection, and wireless media such as acoustic, radio frequency, infrared, and other wireless media. Combinations of any of the above should also be included within the scope of computer-readable media.

By way of example, and not limitation, computer-readable storage media can include volatile and non-volatile, removable and non-removable media implemented in any method or technology for storage of information such as computer-readable instructions, data structures, program modules, or other data. For example, computer-readable storage media includes, but is not limited to, RAM 406, ROM 408, EPROM, EEPROM, flash memory or other solid-state memory technology, CD-ROM, digital versatile disks ("DVD"), HD-DVD, BLU-RAY, 4K Ultra BLU-RAY, or other optical storage, magnetic cassettes, magnetic tape, magnetic disk storage or other magnetic storage devices, or any other medium that can be used to store the desired information and which can be accessed by the computer 400. For purposes of the claims, the phrase "computer-readable storage medium," and variations thereof, does not include waves or signals per se or communication media.

According to various configurations, the computer 400 can operate in a networked environment using logical connections to a remote computer(s) 424 through a network 420. For example, if the computer 400 corresponds to computing device 108 then the remote computer 424 may correspond to a computing device that maintains the electronic record 112. The computer 400 can connect to the network 420 through a network interface unit 422 connected to the bus 410. It should be appreciated that the network interface unit 422 can also be utilized to connect to other types of networks and remote computer systems. The computer 400 can also include an input/output controller 418 for receiving and processing input from a number of other devices, including a keyboard, mouse, touch input, an electronic stylus (not shown), or equipment such as a sequencer 106 for detecting the sequence of polynucleotides or other type of synthetic molecular tag. Similarly, the input/output controller 418 can provide output to a display screen or other type of output device (not shown).

It should be appreciated that the software components described herein, when loaded into the processing unit(s) 402 and executed, can transform the processing unit(s) 402 and the overall computer 400 from a general-purpose computing device into a special-purpose computing device customized to facilitate the functionality presented herein. The processing unit(s) 402 can be constructed from any number of transistors or other discrete circuit elements, which can individually or collectively assume any number of states. More specifically, the processing unit(s) 402 can operate as a finite-state machine, in response to executable instructions contained within the software modules disclosed herein. These computer-executable instructions can transform the processing unit(s) 402 by specifying how the processing unit(s) 402 transitions between states, thereby transforming the transistors or other discrete hardware elements constituting the processing unit(s) 402.

Encoding software modules can also transform the physical structure of the computer-readable media presented herein. The specific transformation of physical structure depends on various factors, in different implementations of this description. Examples of such factors include, but are not limited to, the technology used to implement the computer-readable media, whether the computer-readable media is characterized as primary or secondary storage, and the like. For example, if the computer-readable media is implemented as semiconductor-based memory, the software disclosed herein can be encoded on the computer-readable media by transforming the physical state of the semiconductor memory. For instance, the software can transform the state of transistors, capacitors, or other discrete circuit elements constituting the semiconductor memory. The software can also transform the physical state of such components to store data thereupon.

As another example, the computer-readable media disclosed herein can be implemented using magnetic or optical technology. In such implementations, the software presented herein can transform the physical state of magnetic or optical media, when the software is encoded therein. These transformations can include altering the magnetic characteristics of particular locations within given magnetic media. These transformations can also include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer 400 to store and execute software components and functionalities presented herein. It also should be appreciated that the architecture shown in FIG. 4 for the computer 400, or a similar architecture, can be utilized to implement many types of computing devices such as desktop computers, notebook computers, servers, supercomputers, gaming devices, tablet computers, and other types of computing devices known to those skilled in the art. It is also contemplated that the computer 400 might not include all of the components shown in FIG. 4, can include other components that are not explicitly shown in FIG. 4, or can utilize an architecture completely different than that shown in FIG. 4.

Illustrative Embodiments

The following clauses described multiple possible embodiments for implementing the features described in this disclosure. The various embodiments described herein are not limiting nor is every feature from any given embodiment required to be present in another embodiment. Any two or more of the embodiments may be combined together unless context clearly indicates otherwise. As used herein in this document "or" means and/or. For example, "A or B" means A without B, B without A, or A and B. As used herein, "comprising" means including all listed features and potentially including addition of other features that are not listed. "Consisting essentially of" means including the listed features and those additional features that do not materially affect the basic and novel characteristics of the listed features. "Consisting of" means only the listed features to the exclusion of any feature not listed.

Clause 1. A method for tracking movement of an item (102) through a supply chain comprising: adding a first synthetic molecular tag (100A) to the item (102) at a first site in a supply chain (104A); adding a second synthetic molecular tag (100B) with a different sequence than the first synthetic molecular tag (100A) to the item (102) at a second site in the supply chain (104B); collecting the first synthetic molecular tag (100A) and the second synthetic molecular tag (100B) from the item (102); sequencing the first synthetic molecular tag (100A) and the second synthetic molecular tag (100B) collected from the item (102) to generate a first tag sequence (110A) and a second tag sequence (110B); comparing the first tag sequence (110A) and the second tag sequence (110B) to an electronic record (112) containing a first reference sequence (208A) associated with a description of the first site in the supply chain (208A) and a second reference sequence associated with a description of the second site in the supply chain (208B); and determining that the item (102) was at the first site (104A) in the supply chain and at the second site (104B) in the supply chain based on the electronic record (112).

Clause 2. The method of clause 1, further comprising: synthesizing a plurality of copies of the first synthetic molecular tag (100A) and a plurality of copies of the second synthetic molecular tag (100B); registering, in the electronic record (112), an association between at least a portion of a reference sequence (208A) of the first synthetic molecular tag (100A) and a description of the first site in the supply chain (208A) and an association between at least a portion of the reference sequence (208B) of the second synthetic molecular tag (100B) and a description of the second site in the supply chain (210B); and distributing the plurality of copies of the first synthetic molecular tag to the first site in the supply chain and the plurality of copies of the second synthetic molecular tag to the second site in the supply chain.

Clause 3. The method of clause 1 and 2, wherein the first synthetic molecular tag and the second synthetic molecular tag are polynucleotides.

Clause 4. The method of clause 3, wherein the first synthetic molecular tag and the second synthetic molecular tag comprise the same forward and reverse primer binding sites (202).

Clause 5. The method of clause 3 or 4, wherein the first tag sequence (110A) is not identical to any reference sequence (208) contained in the electronic record (112) and determining that the item (102) was at the first site in the supply chain (104A) comprises: determining that the first tag sequence (110A) is more similar to the first reference sequence (208A) than to any other reference sequence (208B, 208C) in the electronic record (112).

Clause 6. The method of clause 1, wherein a first synthetic molecular tag encodes a date and further comprising determining a freshness of the item based on the date.

Clause 7. The method of any of clauses 1-6, wherein adding the first synthetic molecular tag to the item comprises contacting a surface of the item with a liquid solution containing the first synthetic molecular tag or wherein the item is liquid and wherein adding the first synthetic molecular tag to the item comprises placing the first synthetic molecular tag in the item.

Clause 8. The method of any of clauses 1-7, wherein sequencing the first synthetic molecular tag and the second synthetic molecular tag comprises a first toehold-mediated strand-displacement reaction with the first synthetic molecular tag and a second toehold-mediated strand-displacement reaction with the second synthetic molecular tag.

Clause 9. The method of any of clauses 1-8, wherein the electronic record (112) is maintained on one or more network-accessible computing devices at one or more locations physically distant from the first site and from the second site.

Clause 10. The method of any of clauses 1-9, further comprising: displaying on a user interface (116) of a computing device (108) physically proximate to the item (102) a list or map (114) showing the first site in the supply chain and the second site in the supply chain.

Clause 11. A method of identifying a recalled item comprising: collecting from an item (102) a plurality of synthetic molecular tags (100) each representing a different site in a supply chain (104); sequencing the plurality of synthetic molecular tags (100) to generate tag sequences (110); determining, by comparison to an electronic record (112), that at least one of the plurality of synthetic molecular tags (100) is associated with a site in the supply chain (104) linked to a product recall; and identifying the item (102) as a recalled item.

Clause 12. The method of clause 11, further comprising: synthesizing a plurality of copies of each of the plurality of synthetic molecular tags (100); registering, in the electronic record, associations between reference sequences (208) for individual ones of the plurality of synthetic molecular tags (100) and descriptions of sites in the supply chain (208); distributing the plurality of copies of each of the plurality of synthetic molecular tags (100) to the respective sites in the supply chain (104) with which the individual ones of the plurality of synthetic molecular tags (100) are associated with in the electronic record (112); and adding to the item (102), at each site in the supply chain (104), the respective synthetic molecular tag associated with that site in the supply chain (104).

Clause 13. The method of clause 11 or 12, further comprising recording in the electronic record (112) an indication (210) that the site in the supply chain (104) is linked to a product recall.

Clause 14. The method of any of clauses 11-13, further comprising displaying on a user interface (116) of a computing device (108) located physically proximate to the item (102) an indication that the item is the recalled item.

Clause 15. The method of any of clause 11-14, wherein the synthetic molecular tags are polynucleotides.

Clause 16. The method of any of clauses 11-15, wherein the item is a food item and the synthetic molecular tags are edible.

Clause 17. An item (102) labeled with a plurality of synthetic molecular tags (100) added to the item as the item moved through sites in a supply chain (104), each synthetic molecular tag (100) uniquely associated in an electronic record (112) with a respective one of the sites in the supply chain (104).

Clause 18. The item of clause 17, wherein the item (102) is a food item and the synthetic molecular tags (100) are polynucleotides.

Clause 19. The item of clause 18, wherein at least a portion of a sequence of each of the polynucleotides are uniquely associated in the electronic record (112) with a description of one of the sites in supply chain (208).

Clause 20. The item of clause 18 or 19, wherein each of the polynucleotides have the same forward and reverse primer binding sites (202).

CONCLUSION

Although the subject matter has been described in language specific to structural features and/or methodological acts, it is to be understood that the subject matter defined in the appended claims is not necessarily limited to the specific features or acts described above. Rather, the specific features and acts are disclosed as example forms of implementing the claims.

The terms "a," "an," "the" and similar referents used in the context of describing the invention are to be construed to cover both the singular and the plural unless otherwise indicated herein or clearly contradicted by context. The terms "based on," "based upon," and similar referents are to be construed as meaning "based at least in part" which includes being "based in part" and "based in whole," unless otherwise indicated or clearly contradicted by context. The terms "portion," "part," or similar referents are to be construed as meaning at least a portion or part of the whole including up to the entire noun referenced. As used herein, "approximately" or "about" or similar referents denote a range of +10% of the stated value.

For ease of understanding, the processes discussed in this disclosure are delineated as separate operations represented as independent blocks. However, these separately delineated operations should not be construed as necessarily order-dependent in their performance. The order in which the processes are described is not intended to be construed as a limitation, and unless other otherwise contradicted by context any number of the described process blocks may be combined in any order to implement the process or an alternate process. Moreover, it is also possible that one or more of the provided operations is modified or omitted.

Certain embodiments are described herein, including the best mode known to the inventors for carrying out the invention. Of course, variations on these described embodiments will become apparent to those of ordinary skill in the art upon reading the foregoing description. Skilled artisans will know how to employ such variations as appropriate, and the embodiments disclosed herein may be practiced otherwise than specifically described. Accordingly, all modifications and equivalents of the subject matter recited in the claims appended hereto are included within the scope of this disclosure. Moreover, any combination of the above-described elements in all possible variations thereof is encompassed by the invention unless otherwise indicated herein or otherwise clearly contradicted by context.

Furthermore, references have been made to publications, patents and/or patent applications throughout this specification. Each of the cited references is individually incorporated herein by reference for its particular cited teachings as well as for all that it discloses.

The invention claimed is:

1. A method for tracking movement of an item through a supply chain comprising:
   adding a first synthetic molecular tag to the item at a first site in a supply chain;
   adding a second synthetic molecular tag with a different sequence than the first synthetic molecular tag to the item at a second site in the supply chain, wherein the first synthetic molecular tag and the second synthetic molecular tag are polynucleotides;
   collecting the first synthetic molecular tag and the second synthetic molecular tag from the item;
   detecting the first synthetic molecular tag and the second synthetic molecular tag collected from the item to generate a first tag sequence and a second tag sequence, wherein detecting the first synthetic molecular tag and the second synthetic molecular tag comprises a first toehold-mediated strand-displacement reaction with the first synthetic molecular tag and a second toehold-mediated strand-displacement reaction with the second synthetic molecular tag;
   comparing the first tag sequence and the second tag sequence to an electronic record containing a first reference sequence associated with a description of the first site in the supply chain and a second reference sequence associated with a description of the second site in the supply chain; and
   determining that the item was at the first site in the supply chain and at the second site in the supply chain based on the electronic record.

2. The method of claim 1, further comprising:
   synthesizing a plurality of copies of the first synthetic molecular tag and a plurality of copies of the second synthetic molecular tag;
   registering, in the electronic record, an association between at least a portion of a reference sequence of the first synthetic molecular tag and a description of the first site in the supply chain and an association between at least a portion of the reference sequence of the second synthetic molecular tag and a description of the second site in the supply chain; and
   distributing the plurality of copies of the first synthetic molecular tag to the first site in the supply chain and the plurality of copies of the second synthetic molecular tag to the second site in the supply chain.

3. The method of claim 1, wherein the first synthetic molecular tag and the second synthetic molecular tag comprise the same forward and reverse primer binding sites.

4. The method of claim 1, wherein the first tag sequence is not identical to any reference sequence contained in the electronic record and determining that the item was at the first site in the supply chain comprises:
   determining that the first tag sequence is more similar to the first reference sequence than to any other reference sequence in the electronic record.

5. The method of claim 1, wherein the first synthetic molecular tag encodes a date and further comprising determining a freshness of the item based on the date.

6. The method of claim 1, wherein adding the first synthetic molecular tag to the item comprises contacting a surface of the item with a liquid solution containing the first synthetic molecular tag or wherein the item is liquid and wherein adding the first synthetic molecular tag to the item comprises placing the first synthetic molecular tag in the item.

7. The method of claim 1, wherein the electronic record is maintained on one or more network-accessible computing devices at one or more locations physically distant from the first site and from the second site.

8. The method of claim 1, further comprising:
displaying on a user interface of a computing device physically proximate to the item a list or map showing the first site in the supply chain and the second site in the supply chain.

9. A method for tracking movement of an item through a supply chain comprising:
synthesizing a plurality of copies of a first synthetic molecular tag and a plurality of copies of a second synthetic molecular tag,
wherein the first synthetic molecular tag and the second synthetic molecular tag are polynucleotides,
wherein each of the first and second synthetic molecular tags comprises a supply chain site encoding region,
wherein a sequence in the supply chain site encoding region of the first synthetic molecular tag represents a first site,
wherein a sequence in the supply chain site encoding region of the second synthetic molecular tag represents a second site, and
wherein a difference between the supply chain site encoding region of the first synthetic molecular tag and the supply chain site encoding region of the second synthetic molecular tag is maximized by selecting sequences for the supply chain encoding regions that are as different from each other as possible for a given number of supply chain sites;
registering, in an electronic record, an association between at least a portion of a first reference sequence of the first synthetic molecular tag and a description of the first site in the supply chain and an association between at least a portion of a second reference sequence of the second synthetic molecular tag and a description of the second site in the supply chain;
distributing the plurality of copies of the first synthetic molecular tag to the first site in the supply chain and the plurality of copies of the second synthetic molecular tag to the second site in the supply chain;
adding the first synthetic molecular tag to the item at the first site in the supply chain;
adding the second synthetic molecular tag with a different sequence than the first synthetic molecular tag to the item at the second site in the supply chain;
collecting the first synthetic molecular tag and the second synthetic molecular tag from the item;
detecting the first synthetic molecular tag and the second synthetic molecular tag collected from the item to generate a first tag sequence and a second tag sequence, wherein detecting the first synthetic molecular tag and the second synthetic molecular tag comprises a first toehold-mediated strand-displacement reaction with the first synthetic molecular tag and a second toehold-mediated strand-displacement reaction with the second synthetic molecular tag;
comparing the first tag sequence and the second tag sequence to the electronic record containing the first reference sequence associated with a description of the first site in the supply chain and the second reference sequence associated with a description of the second site in the supply chain; and
determining that the item was at the first site in the supply chain and at the second site in the supply chain based on the electronic record.

10. The method of claim 1, wherein each of the first and second synthetic molecular tags comprises a supply chain site encoding region encoding a respective supply site, an information encoding region encoding a type of item or a date, and the first synthetic molecular tag and the second synthetic molecular tag comprise the same forward and reverse primer binding sites.

11. The method of claim 9, wherein each of the first and second synthetic molecular tags comprises an information encoding region encoding a type of item or a date and the first synthetic molecular tag and the second synthetic molecular tag comprise the same forward and reverse primer binding sites.

* * * * *